US011912934B2

United States Patent
Martin et al.

(10) Patent No.: US 11,912,934 B2
(45) Date of Patent: Feb. 27, 2024

(54) STABILIZED FRICTION REDUCER EMULSIONS

(71) Applicant: RHODIA OPERATIONS, Aubervilliers (FR)

(72) Inventors: Helène Martin, Chatillon (FR); Patrick Moreau, Saint-Denis (FR); Arnaud Cadix, Lille (FR)

(73) Assignee: RHODIA OPERATIONS, Aubervilliers (FR)

( * ) Notice: Subject to any disclaimer, the term of this patent is extended or adjusted under 35 U.S.C. 154(b) by 142 days.

(21) Appl. No.: 17/436,848

(22) PCT Filed: Mar. 11, 2020

(86) PCT No.: PCT/EP2020/056570
§ 371 (c)(1),
(2) Date: Sep. 7, 2021

(87) PCT Pub. No.: WO2020/182919
PCT Pub. Date: Sep. 17, 2020

(65) Prior Publication Data
US 2022/0177774 A1 Jun. 9, 2022

(30) Foreign Application Priority Data
Mar. 12, 2019 (EP) .................................. 19162084

(51) Int. Cl.
*C09K 8/68* (2006.01)
*C09K 8/60* (2006.01)

(52) U.S. Cl.
CPC ................ *C09K 8/68* (2013.01); *C09K 8/602* (2013.01); *C09K 2208/28* (2013.01)

(58) Field of Classification Search
CPC .......... C09K 8/36; C09K 8/602; C09K 8/604; C09K 8/64; C09K 2208/28
See application file for complete search history.

(56) References Cited

U.S. PATENT DOCUMENTS

| 4,672,090 A * | 6/1987 | Chan .......................... C08F 2/32 516/27 |
| 8,192,552 B2 | 6/2012 | Chang |
| 8,357,724 B2 | 1/2013 | Deroo et al. |
| 9,980,387 B2 | 5/2018 | Lim |
| 2011/0040025 A1* | 2/2011 | Deroo .................... C06B 47/145 524/548 |
| 2011/0130321 A1 | 6/2011 | Karagianni et al. |
| 2017/0158948 A1 | 6/2017 | Kim et al. |

FOREIGN PATENT DOCUMENTS

| EP | 1440680 A1 | 7/2004 |
| JP | 50127991 A | 10/1975 |
| WO | 9630421 A1 | 10/1996 |
| WO | 9801478 A1 | 1/1998 |
| WO | 9858974 A1 | 12/1998 |
| WO | 9903894 A1 | 1/1999 |
| WO | 9931144 A1 | 6/1999 |
| WO | 9935177 A1 | 7/1999 |
| WO | 9935178 A1 | 7/1999 |
| WO | 0040628 A1 | 7/2000 |
| WO | 0075207 A1 | 12/2000 |
| WO | 0210223 A2 | 2/2002 |
| WO | 0222688 A2 | 3/2002 |
| WO | 0226836 A2 | 4/2002 |
| WO | 2020182919 A1 | 9/2020 |

OTHER PUBLICATIONS

Schmolka, "A review of block polymer surfactants", Journal of the American Oil Chemists Society, 1977, pp. 110-116, vol. 54, Issue 3.
Wilczek-Vera, "Individual Block Length Distrubution of Block Copolymers of Polystyrene-block-Poly(alpha- methylstyrene) by MALDI/TOF Mass Spectrometry", Macromolecules, 1996, 29, pp. 4036-4044.
S. Katayose and K. Kataoka, Proceed. Intern. Symp. Control. Rel. Bioact. Mater., 1996, vol. 23: pp. 899.
Quirk and Lee, "Experimental Criteria for Living Polymerizations", Polymer International, vol. 27, Issue 4, 1992, pp. 359-367.
Otsu, "Role of initiator-transfer agent-terminator (iniferter) in radical polymerizations: Polymer design by organic disulfides as iniferters", Makromol Chem., Rapid Commun., vol. 3, Issue 2, 1982, pp. 127-132.
Matyjaszewski et al., "Controlled Radical Polymerizations: The Use of Alkyl Iodides in Degenerative Transfer", Macromolecules, 1995, vol. 28, Issue 6, pp. 2093-2095.
Webster O.W, "Group Transfer Polymerization", Encyclopedia of polymer Science and Engineering, 1987, vol. 7, pp. 580-588, Edited by H.F Mark, N.M Bikales, C.G Overberger and G Menges.
D Braun, "Initiation of free radical polymerization by thermal cleavage of carbon-carbon bonds", Macromolecular Symposia, 1996, vol. 111, Issue 1, pp. 63-71.
Wayland, "Living Radical Polymerization of Acrylates by Organocobalt Porphyrin Complexes", J. Am. Chem. Soc. 1994, vol. 116, 17, pp. 7943-7944, Publication Date:Aug. 1, 1994.

* cited by examiner

Primary Examiner — Aiqun Li
(74) Attorney, Agent, or Firm — Osha Bergman Watanabe & Burton LLP

(57) ABSTRACT

The instant invention friction reducer formulation comprising friction reducer polymers such as PAM within the dispersed phase of an inverse emulsion containing a composition C which comprises a mixture of: —at least an alkanolamide emulsifier; and —a block copolymer comprising: —a hydrophilic block A comprising units deriving from a mono-alpha-ethylenically-unsaturated monomers; and —a hydrophobic block B.

8 Claims, No Drawings

STABILIZED FRICTION REDUCER EMULSIONS

This application is a U.S. national phase entry under 35 U.S.C. §371 of International Application No. PCT/EP2020/056570, filed on Mar. 11, 2020, which claims priority to European Application No. 19162084.8, filed on Mar. 12, 2019. The entire contents of these applications are explicitly incorporated herein by this reference.

The instant invention relates to the field of hydraulic fracturing used for oil or gas recovery from subterranean formations. More precisely, it relates to friction reducers used in the scope of hydraulic fracturing.

In hydraulic fracturing operations, a base aqueous fluid is pumped at high flow rate typically through a steel pipe down to an oil or gas oil bearing formation. Hydraulic pressure applied by the fluid break open a fracture network. After completion of the operation, oil or gas production yield shall be dramatically enhanced thanks to eased flow through fractures.

In this scope, it is well known to make use of high molecular weight polymers such as polyacrylamides (PAM), that impart a friction reduction (FR) effect, notably by preventing turbulences in the pipe at high flow rate. The addition of such polymers (herein referred as "FR polymers") at concentration typically from 10 to 100 ppm active polymer over base fluid, improves dramatically fracturing efficiency, with higher flow rate achieved with less pumping horsepower.

As used in the instant description the term "polyacrylamide" or "PAM" refers to an homo- or co-polymer including—or consisting in—acrylamide units.

FR polymers such as PAM are typically used in hydraulic fracturing operations in the form of inverse emulsions, comprising the FR polymers in their dispersed aqueous phase. One of the technologies used to obtain PAM, is the polymerization in inverse emulsion, that allows to obtain these polymers in that form of delivery. The use of FR polymers such as PAM in the form of an inverse emulsion is of specific interest since it may allow flowable high active formulations with relatively fast hydration and simple dosing in the base fluid flow stream.

Nevertheless, to be concretely used as friction reducer, drastic stability and hydration speed requirements have to be met by the inverse emulsion:
- as regards stability: application in oil fields implies storage of the inverse emulsions in outside locations for extended periods of time. Stability may be limited by exposure to either high (up to 50° C.) or low temperature (−20° C.) for several months in extreme climate locations. Flocculation, creaming or gelation may be observed under such conditions.
- as regards hydration speed: flow rates of base fluid during a hydraulic fracturing operation are very high and pressure drop by pipe unit length from turbulence have to be limited as soon as possible. As the inverse emulsion is contacting the base fluid, FR polymer has to be released in the base fluid within delivery times of the order of seconds.

In addition, release of the polymer to the water phase has to be quantitative, ideally with 100% of the FR polymer solubilized in fine to the water phase. It is however known that hydration of inverse emulsion polymers is often limited by the formation of stable multiple emulsion drops entrapping polymer drops otherwise aggregates or lumps may also form yielding to limited polymer performance.

Emulsions are compositions, usually liquid or gelled, comprising at least two phases which are not miscible, one phase being dispersed in the form or droplets in the other. Using surfactants allows obtaining the dispersion of one of the phases in the other. Thus, emulsions are usually obtained by mixing the phases and surfactants.

As used herein, the term "emulsion" preferably refers to such a dispersed mixture with one phase dispersed in another, said mixture being thermodynamically less stable than a phase-separated system, which excludes the case of so-called "microemulsions" which are thermodynamically more stable than the phase-separated system.

One aim of the present invention is to provide inverse emulsions useful in the scope of hydraulic fracturing having i.a. a very good storage stability.

To this end, it is proposed according to the present invention to make use, in the inverse emulsion of FR polymer, of a specific emulsifier package comprising (1) an emulsifier including an alkanolamides; and (2) a specific block copolymer.

More precisely, according to a first aspect, one subject-matter of the present invention is a friction reducer formulation comprising friction reducer polymers (preferably PAM homo- or co-polymers) within the dispersed phase of an inverse emulsion, wherein said inverse emulsion contains a composition, herein referred as "composition C", comprising a mixture of:
- at least an alkanolamide emulsifier (optionally together with other emulsifiers); and
- a block copolymer comprising:
  - a block A which is a hydrophilic block comprising units deriving from a mono-alpha-ethylenically-unsaturated monomers; and
  - a block B which is a hydrophobic block, preferably deriving from a mono-alpha-ethylenically-unsaturated monomers.

According to a second aspect, one other subject-matter of the present is a fracturing fluid comprising the friction reducer formulation as defined above.

According to a more specific aspect, one other subject-matter of the present is the use of the inverse emulsion stabilized by the composition C as defined above for providing a fiction reducer effect during a hydraulic fracturing operation.

In the composition C useful according to the invention, the block copolymer acts together with the emulsifier containing the alkanolamide, and the mixture of the two compounds allows a good emulsification and a good stability of the obtained emulsion, especially in the case of inverse emulsions. Most of the time, the copolymer provides, as such, an emulsifier effect, but the mixture exhibit emulsification and stability effects that are more than the simple addition of the effect of each of the ingredients taken alone.

The composition C as used according to the invention allows to obtain a very good stability storage (typically, the particle size remains stable over extended periods storage, even if exposed to high temperature storage conditions, e.g. 50° C.), generally without any (or only very few) formation of flocs.

It is important to note that the presence of flocs or polymer aggregates slows or eventually prevents Friction Reducer (FR) polymer hydration thus reduces friction reduction performance. The fast and complete release and hydration of the FR polymer to the base aqueous fluid can advantageously increase significantly the viscosity of the system after the inversion phase occurs.

Preferably, the ratio copolymer/alkanolamide, corresponding to the quotient of the total mass of copolymer contained in composition C, to the total mass of the alkanolamide emulsifier contained in composition C is between 1% and 40%, this ratio being preferably of at most 30%, for example of at most 20%. Typically, the ratio copolymer/alkanolamide may advantageously be comprised between 2% and 20%, for example between 2.5% and 10%. The block copolymer and the alkanolamide emulsifier cooperate especially good i.a. with such mass ratios.

Typically, the composition C is used in an emulsion at a content of between 0.5% and 5%, for example 1% and 4% in mass, based on the total mass of the emulsion containing the composition C.

For example, an emulsion may be stabilized according to the invention by introducing in the emulsion:
from 1% to 5% of an alkanolamide emulsifier; and
from 0.01 to 0.5%, for example from 0.02% to 0.2% of copolymer,
the percentages being in mass, based on the total mass of the emulsion containing the composition C.

Specific features and possible embodiments will now been described in more details.

The Alkanolamide Emulsifier

The alkanolamide emulsifier present in the composition C of the invention is a compound bearing both an amide and hydroxyl functional groups. This alkanolamide emulsifier is typically a compound having the Formula (I) below:

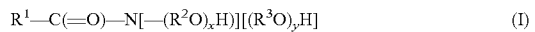  (I)

wherein:
$R^1$ is an hydrocarbon chain bearing typically from 5 to 24 carbon atoms, preferably at least 10 and typically at least 16,
each of $R^2$ and $R^3$, which are the same or not, are hydrocarbon chain bearing from 2 to 4 carbon atoms,
each of x and y, which are the same or not, are of between 1 and 5.

Alkanolamide emulsifiers suitable in composition C especially include compounds of formula (I) wherein x=y=1, namely compounds having the Formula (Ia) below:

  (Ia)

wherein $R^1$, $R^2$ and $R^3$ have the meanings given above.

According to a specific embodiment, R2 and R3 are the same. Alkanolamide emulsifiers suitable in this connection include e.g. compounds of formula (Ib) below:

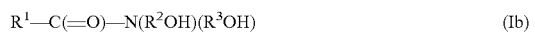  (Ib)

wherein $R^1$, $R^2$ and $R^3$ have the meanings given above, $R^2$ and $R^3$ being typically the same.

Alternatively, partially esterified alkanolamides of formula (I), (Ia) and (Ib) may be used, typically alkanolamides of formula (I), (Ia) and (Ib) wherein one of the two terminal —OH group (carried by either the —$(R^2O)_xH$ group or the [—$(R^3O)_yH$ group) is esterified in the form of a —$(R^2O)_xR^4$ group or —$(R^3)_y$ $R^4$ group, wherein $R^4$ is a hydrocarbon chain bearing from 2 to 4 carbon atoms, when the other terminal —OH group (respectively carried by either the [—$(R^3O)_yH$ group-(or the $R^2O)_xH$ group) is not esterified.

Suitable commercial alkanolamide emulsifier useful according to the instant invention include notably alkyl and alkenyl diethanolamides such as Mackamide® WS 1 or Mackamide® MO (oleyl diethanolamides), or Mackamide® S (soy diethanolamide) available from the Solvay company. According to a specific embodiment, the alkanolamide is Mackamide® WS 1.

Another suitable alkanolamide emulsifier is a partially-esterified N,N-alkanol fatty amide surfactant called Witcamide 511, which is commercially available from the Akzo Company. This surfactant is described in the literature as being approximately 50 percent, by weight, unesterified N,N-diethanol fatty amide, approximately 40 percent, by weight, monoesterified N,N-diethanol fatty amide and some quantity of diesterified material, wherein the fatty groups on the emulsifier chain are approximately 64 percent oleyl, 33 percent linoleic and 3 percent palmetyl.

The Block Copolymer

Typically, the block copolymer present in the composition C of the invention is selected from:
(block A)-(block B) di-block copolymers;
(block A)-(block B)-(block A) tri-block copolymers; and
(block B)-(block A)-(block B) tri-block copolymers.

According to a preferred embodiment, the block copolymer is a (block A)-(block B) di-block copolymer.

The block copolymer is typically a linear block copolymer. By "linear" it is meant that the blocks arrangement is linear. However, in specific embodiments, a block may be a block having a comb polymer structure, that is comprising repetitive units comprising a polymeric moiety (macromonomers).

A block is usually defined by repeating units it comprises. A block may be defined by naming a polymer, or by naming monomers it is derived from. In the present specification, a unit deriving from a monomer is understood as a unit that may be directly obtained from the said monomer by polymerizing. Thus, a unit deriving from an ester of acrylic or methacrylic acid does not encompass a unit of formula —$CH_2$—CH(COOH)— or —$CH_2$—$C(CH_3)$(COOH)—, obtained for example by polymerizing an ester of acrylic or methacrylic acid and then hydrolyzing. But a unit deriving from acrylic acid or methacrylic acid encompasses for example a unit obtained by polymerizing a monomer and then reacting (for example hydrolyzing) to obtain units of formula —$CH_2$—CH(COOH)— or —$CH_2$—$C(CH_3)$(COOH)—.

A block may be a copolymer, comprising several kind of repeating units, deriving from several monomers. Hence, block A and block B are different polymers, deriving from different monomers, but they may comprise some common repeating units (copolymers). Block A and Block B preferably do not comprise more than 50% of a common repeating unit (derived from the same monomer).

Block A is hydrophilic and block B is hydrophobic. Hydrophilic or Hydrophobic properties of a block refer to the property said block would have without the other block(s), that is the property of a polymer consisting of the same repeating units than said block, having the same molecular weight. By hydrophilic block, polymer or copolymer, it is meant that the block, polymer or copolymer does not phase separate macroscopically in water at a concentration from 0.01% and 10% by weight, at a temperature from 20° C. to 30° C. By hydrophobic block, polymer or copolymer, it is meant that the block, polymer or copolymer does phase separate macroscopically in the same conditions.

It is further mentioned that the block copolymer may be soluble in water, ethanol, and/or in a hydrophobic compound. In a preferred embodiment, the block copolymer is soluble in water, ethanol or in a mixture of water and ethanol. The block copolymer may be introduced in the emulsion, or in the mixture of the compounds comprised in the emulsion, in a solid form, or in a solution form. In a specific embodiment it is introduced as a water, ethanol, or water/ethanol solution.

Preferably, block B comprises repeating units deriving from monomers selected from the group consisting of:
- alkylesters of an alpha-ethylenically-unsaturated, preferably mono-alpha-ethylenically-unsaturated, monocarboxylic acid, such as methylacrylate, ethylacrylate, n-propylacrylate, n-butylacrylate, methylmethacrylate, ethylmethacrylate, n-propylmethacrylate, n-butylmethacrylate, and 2-ethyl-hexyl acrylate, 2-ethyl-hexyl methacrylate, isooctyl acrylate, isooctyl methacrylate, lauryl acrylate, lauryl methacrylate,
- vinyl Versatate,
- acrylonitrile,
- vinyl nitriles, comprising from 3 to 12 carbon atoms,
- vinylamine amides, and
- vinylaromatic compounds such as styrene.

An especially suitable block B according to the invention comprises repeating units deriving from alkylesters of an alpha-ethylenically-unsaturated, preferably mono-alpha-ethylenically-unsaturated, monocarboxylic acid, for example 2-ethyl-hexyl acrylate.

On the other hand, block A preferably comprises repeating units deriving from monomers selected from the group consisting of:
- vinyl alcohol,
- N-vinyl pyrrolidone,
- acrylamide, methacrylamide, N,N-dimethylacrylamide,
- polyethylene oxide (meth)acrylate (i.e. polyethoxylated (meth)acrylic acid),
    - hydroxyalkylesters of alpha-ethylenically-unsaturated, preferably mono-alpha-ethylenically-unsaturated, monocarboxylic acids, such as 2-hydroxyethylacrylate, and
    - hydroxyalkylamides of alpha-ethylenically-unsaturated, preferably mono-alpha-ethylenically-unsaturated, monocarboxylic acids,
    - dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
- ethylenimine, vinylamine, 2-vinylpyridine, 4-vinyl pyridine;
    - trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth)acrylamido chloride, vinylbenzyl trimethyl ammonium chloride,
- diallyldimethyl ammonium chloride,
    - alpha-ethylenically-unsaturated, preferably mono-alpha-ethylenically-unsaturated, monomers comprising a phosphate or phosphonate group,
    - alpha-ethylenically-unsaturated, preferably mono-alpha-ethylenically-unsaturated, monocarboxylic acids, such as acrylic acid, methacrylic acid
    - monoalkylesters of alpha-ethylenically-unsaturated, preferably mono-alpha-ethylenically-unsaturated, dicarboxylic acids,
    - monoalkylamides of alpha-ethylenically-unsaturated, preferably mono-alpha-ethylenically-unsaturated, dicarboxylic acids,
    - alpha-ethylenically-unsaturated, preferably mono-alpha-ethylenically-unsaturated, compounds comprising a sulphonic acid group, and salts of alpha-ethylenically-unsaturated, preferably mono-alpha-ethylenically-unsaturated, compounds comprising a sulphonic acid group, such as vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, amine salts, such as dimethylcyclohexylamine, and styrenesulfonate (SS).

An especially suitable block A according to the invention comprises repeating units deriving from N-vinyl pyrrolidone, acrylamide, N,N-dimethylacrylamide and/or methacrylamide.

According to a specific embodiment, the copolymer present in the composition C is a diblock copolymer comprising a block A comprising repeating units deriving from N-vinyl pyrrolidone; and a block B that comprises repeating units deriving from 2-ethyl-hexyl acrylate.

While block B is usually a neutral block, block A might be discriminated as regard to its electrical behavior or nature. It means that block A may be a neutral block, or a polyionic block (a polyanionic block, or a polycationic block). It is further mentioned the electrical behavior or nature (neutral, polyanionic or polycationic) may depend on the pH of the emulsion. By polyionic it is meant that the block comprises ionic (anionic or cationic) repetitive units whatever the pH, or that the block comprises repetitive units that may be neutral or ionic (anionic or cationic) depending on the pH of the emulsion (the units are potentially ionic). A unit that may be neutral or ionic (anionic or cationic), depending on the pH of the composition, will be thereafter referred as an ionic unit (anionic or cationic), or as a unit deriving from an ionic monomer (anionic or cationic), whatever it is in a neutral form or in an ionic form (anionic or cationic).

Examples of polycationic blocks are blocks comprising units deriving from cationic monomers such as:
- aminoalkyl (meth)acrylates, aminoalkyl (meth)acrylamides,
    - monomers, including particularly (meth)acrylates, and (meth)acrylamides derivatives, comprising at least one secondary, tertiary or quaternary amine function, or a heterocyclic group containing a nitrogen atom, vinylamine or ethylenimine;
- diallyldialkyl ammonium salts;
- their mixtures, their salts, and macromonomers deriving from therefrom.

Examples of cationic monomers include:
- dimethylaminoethyl (meth)acrylate, dimethylaminopropyl (meth)acrylate, ditertiobutylaminoethyl (meth)acrylate, dimethylaminomethyl (meth)acrylamide, dimethylaminopropyl (meth)acrylamide;
- ethylenimine, vinylamine, 2-vinylpyridine, 4-vinylpyridine;
- trimethylammonium ethyl (meth)acrylate chloride, trimethylammonium ethyl (meth)acrylate methyl sulphate, dimethylammonium ethyl (meth)acrylate benzyl chloride, 4-benzoylbenzyl dimethylammonium ethyl acrylate chloride, trimethyl ammonium ethyl (meth)acrylamido (also called 2-(acryloxy)

ethyltrimethylammonium, TMAEAMS) chloride, trimethylammonium ethyl (meth)acrylate (also called 2-(acryloxy)ethyltrimethylammonium, TMAEAMS) methyl sulphate, trimethyl ammonium propyl (meth) acrylamido chloride, vinylbenzyl trimethyl ammonium chloride, diallyldimethyl ammonium chloride, their mixtures, and macromonomers deriving therefrom. Examples of anionic blocks are blocks comprising units deriving from anionic monomers selected from the group consisting of:

alpha-ethylenically-unsaturated, preferably mono-alpha-ethylenically-unsaturated, monomers comprising a phosphate or phosphonate group, alpha-ethylenically-unsaturated, preferably mono-alpha-ethylenically-unsaturated, monocarboxylic acids, monoalkylesters of alpha-ethylenically-unsaturated, preferably mono-alpha-ethylenically-unsaturated, dicarboxylic acids, monoalkylamides of alpha-ethylenically-unsaturated, preferably mono-alpha-ethylenically-unsaturated, dicarboxylic acids, alpha-ethylenically-unsaturated, preferably mono-alpha-ethylenically-unsaturated, compounds comprising a sulphonic acid group, and salts of alpha-ethylenically-unsaturated compounds comprising a sulphonic acid group.

Preferred anionic blocks include blocks comprising deriving from at least one anionic monomer selected from the group consisting of:

acrylic acid, methacrylic acid, vinyl sulphonic acid, salts of vinyl sulfonic acid, vinylbenzene sulphonic acid, salts of vinylbenzene sulphonic acid, alpha-acrylamidomethylpropanesulphonic acid, salts of alpha-acrylamidomethylpropanesulphonic acid 2-sulphoethyl methacrylate, salts of 2-sulphoethyl methacrylate, acrylamido-2-methylpropanesulphonic acid (AMPS), salts of acrylamido-2-methylpropanesulphonic acid, and styrenesulfonate (SS).

Examples of neutral blocks (block A or block B) are blocks comprising units deriving from at least one monomer selected from the group consisting of:

acrylamide, methacrylamide, amides of alpha-ethylenically-unsaturated, preferably mono-alpha-ethylenically-unsaturated, monocarboxylic acids, esters of an alpha-ethylenically-unsaturated, preferably mono-alpha-ethylenically-unsaturated, monocarboxylic acid, for example alkyl esters such as such as methylacrylate, ethylacrylate, n-propylacrylate, n-butylacrylate, methylmethacrylate, ethylmethacrylate, n-propylmethacrylate, n-butylmethacrylate, 2-ethyl-hexyl acrylate, or hydroxyalkyl esters such as 2-hydroxyethylacrylate, polyethylene and/or polypropylene oxide (meth)acrylates (i.e. polyethoxylated and/or polypropoxylated (meth) acrylic acid), vinyl alcohol, vinyl pyrrolidone, vinyl acetate, vinyl Versatate, vinyl nitriles, preferably comprising from 3 to 12 carbon atoms, acrylonitrile, vinylamine amides, vinyl aromatic compounds, such as styrene, and mixtures thereof.

There are several methods for making block copolymers. Some methods for making such copolymers are provided below.

It is possible for example to use anionic polymerization with sequential addition of 2 monomers as described for example by Schmolka, J. Am. Oil Chem. Soc. 1977, 54, 110; or alternatively Wilczek-Veraet et al., Macromolecules 1996, 29, 4036. Another method which can be used consists in initiating the polymerization of a block polymer at each of the ends of another block polymer as described for example by Katayose and Kataoka, Proc. Intern. Symp. Control. Rel. Bioact. Materials, 1996, 23, 899.

In the context of the present invention, it is recommended to use living or controlled polymerization as defined by Quirk and Lee (Polymer International 27, 359 (1992)). Indeed, this particular method makes it possible to prepare polymers with a narrow dispersity and in which the length and the composition of the blocks are controlled by the stoichiometry and the degree of conversion. In the context of this type of polymerization, there are more particularly recommended the copolymers which can be obtained by any so-called living or controlled polymerization method such as, for example:

free-radical polymerization controlled by xanthates according to the teaching of Application WO 98/58974 and U.S. Pat. No. 6,153,705, free-radical polymerization controlled by dithioesters according to the teaching of Application WO 98/01478, free-radical polymerization controlled by dithioesters according to the teaching of Application WO 99/35178, free-radical polymerization controlled by dithiocarbamates according to the teaching of Application WO 99/35177, free-polymerization using nitroxide precursors according to the teaching of Application WO 99/03894, free-radical polymerization controlled by dithiocarbamates according to the teaching of Application WO 99/31144, free-radical polymerization controlled by dithiocarbazates according to the teaching of Application WO 02/26836, free-radical polymerization controlled by halogenated Xanthates according to the teaching of Application WO 00/75207 and U.S. application Ser. No. 09/980,387, free-radical polymerization controlled by dithiophosphoroesters according to the teaching of Application WO 02/10223, free-radical polymerization controlled by a transfer agent in the presence of a disulphur compound according to the teaching of Application WO 02/22688, atom transfer radical polymerization (ATRP) according to the teaching of Application WO 96/30421, free-radical polymerization controlled by iniferters according to the teaching of Otu et al., Makromol. Chem. Rapid. Commun., 3, 127 (1982), free-radical polymerization controlled by degenerative transfer of iodine according to the teaching of Tatemoto et al., Jap. 50, 127, 991 (1975), Daikin Kogyo Co Ltd Japan, and Matyjaszewski et al., Macromolecules, 28, 2093 (1995), group transfer polymerization according to the teaching of Webster O. W., "Group Transfer Polymerization", p. 580-588, in the "Encyclopedia of Polymer Science and Engineering", Vol. 7, edited by H. F. Mark, N. M.

Bikales, C. G. Overberger and G. Menges, Wiley Interscience, New York, 1987, radical polymerization controlled by tetraphenylethane derivatives (D. Braun et al., Macromol. Symp., 111, 63 (1996)), radical polymerization controlled by organocobalt complexes (Wayland et al., J. Am. Chem. Soc., 116, 7973 (1994)).

Preferred processes are sequenced living free-radical polymerization processes, involving the use of a transfer agent. Preferred transfer agents are agents comprising a group of formula —S—C(S)—Y—, —S—C(S)—S—, or —S—P(S)—Y—, or —S—P(S)—S—, wherein Y is an atom different from sulfur, such as an oxygen atom, a nitrogen atom, and a carbon atom. They include dithioester groups, thioether-thione groups, dithiocarbamate groups, dithiphosphoroesters, dithiocarbazates, and xanthate groups. Examples of groups comprised in preferred transfer agents include groups of formula —S—C(S)—NR—NR'2, —S—C(S)—NR—N=CR'2, —S—C(S)—O—R, —S—C(S)—CR=CR'2, and —S—C(S)—X, wherein R and R' are or identical or different hydrogen atoms, or organic groups such as hydrocarbyl groups, optionally substituted, optionally comprising heteroatoms, and X is an halogen atom. A preferred polymerization process is a living radical polymerization using xanthates.

Copolymers obtained by a living or controlled free-radical polymerization process may comprise at least one transfer agent group at an end of the polymer chain. In particular embodiment such a group is removed or deactivated.

A "living" or "controlled" radical polymerization process used to make the block copolymers comprises the steps of:

a) reacting a mono-alpha-ethylenically-unsaturated monomer, at least a free radicals source compound, and a transfer agent, to obtain a first block, the transfer agent being bounded to said first block, b1) reacting the first block, another mono-alpha-ethylenically-unsaturated monomer, and, optionally, at least a radical source compound, to obtain a di-block copolymer, b2) optionally, repeating n times (n being equal to or greater than 0) step b1) to obtain a (n–2)-block copolymer, and then c) optionally, reacting the transfer agent with means to render it inactive.

For example, a "living" or "controlled" radical polymerization process used to make the di-block copolymers comprises the steps of:

a) reacting a mono-alpha-ethylenically-unsaturated monomer, at least a free radicals source compound, and a transfer agent, to obtain a first block, the transfer agent being bounded to said first block, b) reacting the first block, another mono-alpha-ethylenically-unsaturated monomer, and, optionally, at least a radical source compound, to obtain a di-block copolymer, and then c) optionally, reacting the transfer agent with means to render it inactive.

During step a), a first block of the polymer is synthesized. During step b), b1), or b2), another block of the polymer is synthesized.

Examples of transfer agents are transfer agents of the following formula (I):

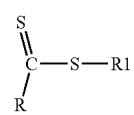

(I)

wherein:

R represents an R2O—, R2R'2N— or R3- group, R2 and R'2, which are identical or different, representing (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R3 representing H, Cl, an alkyl, aryl, alkene or alkyne group, an optionally substituted, saturated or unsaturated (hetero)cycle, an alkylthio, alkoxycarbonyl, aryloxycarbonyl, carboxyl, acyloxy, carbamoyl, cyano, dialkyl- or diarylphosphonato, or dialkyl- or diarylphosphinato group, or a polymer chain, R1 represents (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and The R1, R2, R'2 and R3 groups can be substituted by substituted phenyl or alkyl groups, substituted aromatic groups or the following groups: oxo, alkoxycarbonyl or aryloxycarbonyl (—COOR), carboxyl (—COOH), acyloxy (—O2CR), carbamoyl (—CONR2), cyano (—CN), alkylcarbonyl, alkylarylcarbonyl, arylcarbonyl, arylalkylcarbonyl, isocyanato, phthalimido, maleimido, succinimido, amidino, guanidino, hydroxyl (—OH), amino (—NR2), halogen, allyl, epoxy, alkoxy (—OR), S-alkyl, S-aryl or silyl, groups exhibiting a hydrophilic or ionic nature, such as alkaline salts of carboxylic acids or alkaline salts of sulphonic acid, poly(alkylene oxide) (PEO, PPO) chains, or cationic substituents (quaternary ammonium salts), R representing an alkyl or aryl group.

Preferably, the transfer agent of formula (I) is a dithiocarbonate chosen from the compounds of following formulae (IA), (IB) and (IC):

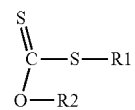

(IA)

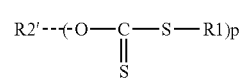

(IB)

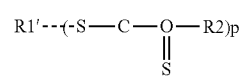

(IC)

wherein:

R2 and R2' represent (i) an alkyl, acyl, aryl, alkene or alkyne group or (ii) an optionally aromatic, saturated or unsaturated carbonaceous ring or (iii) a saturated or unsaturated heterocycle, it being possible for these groups and rings (i), (ii) and (iii) to be substituted, R1 and R1' represent (i) an optionally substituted alkyl, acyl, aryl, alkene or alkyne group or (ii) a carbonaceous ring which is saturated or unsaturated and which is optionally substituted or aromatic or (iii) an optionally substituted, saturated or unsaturated heterocycle or a polymer chain, and p is between 2 and 10.

The average molecular weight of the block copolymer is preferably comprised between 1000 and 100000 g/mol. It is more preferably comprised between 2000 and 20000 g/mol. Within these ranges, the weight ratio of each block may vary. It is however preferred that each block has a molecular weight above 500 g/mol, and preferably above 1000 g/mol. Within these ranges, the weight ratio of block A in the copolymer is preferably greater than or equal to 50%. It is preferably comprised between 90% and 70%.

According to an interesting embodiment corresponding to the appended examples, the block copolymer present in the composition C of the invention is Rhodibloc® RS available from the Solvay company.

The Inverse Emulsions Stabilized According to the Invention

An inverse emulsion comprising the composition C of the invention includes an aqueous phase dispersed in a hydrophobic phase.

The aqueous phase is based on water, and comprises i.a. at least a FR polymer such as a PAM.

The hydrophobic phase is not miscible with the aqueous phase. It is often referred to an oily phase. By "not miscible", it is meant that the ingredient or mixture of ingredients of the hydrophobic phase is preferably not more than 10 weight % soluble in water, at a temperature comprised between 20° C. and the emulsion-preparation temperature or emulsion-use temperature.

Suitable hydrophobic phases include:
organic oils, vegetal oils, mineral oils,
saturated or unsaturated fatty acids, saturated or unsaturated fatty acid esters, saturated or unsaturated fatty alcohols,
diesel and kerosene cutbacks;

In addition, the inverse emulsion stabilized according the instant invention generally includes emulsion inverters. Typically, an emulsion inverter can be any adapted hydrophilic surfactant known to one skilled in the art, such as a high hydrophilic-lipophilic balance (HLB) nonionic surfactant, which has typically a HLB higher than 10 or anionic, cationic or amphoteric surfactants. The examples below illustrate a non-limiting embodiment of the invention and of some of their advantages.

EXAMPLE

This example show the benefit of the combined presence of alkanolamide with Rhodibloc RS polymer in an inverse emulsion, in terms of emulsion stability and yield of inversion.

A single base inverse emulsion (E0) of high molecular weight partially hydrolyzed polyacrylamide (HPAm) was tested, having the following composition, in weight % based on the total weight of the emulsion:
Oil: 17%
Water: 49%
Alkanolamide: 1.5% (Mackamide WS 1)
Alkylethoxylate: 1.5%
HPAm: 31%

Four emulsions E1 to E4 were prepared by post-adding various concentrations of Rhodibloc® RS, as indicated in the table 1 below (the amounts being the weight of active matter based on the total weight of the emulsion):

TABLE 1 the tested emulsions

| Emulsion | Content of Rhodibloc RS |
| --- | --- |
| E0 | 0 |
| E1 | 0.038 |
| E2 | 0.075 |
| E3 | 0.113 |
| E4 | 0.15 |

Storage Stability

Accelerated storage stability tests were performed on the emulsions below at 80° C. To this end, tightly sealed vials of 10 mL containing formulations E0 to E4 were placed in an oven at 80° C. for storage stability assessment. The results are reported in table 2 below.

TABLE 2 storage abilility test—evolution with the storage ime

|  | 0 day (initial) | 7 days | 14 days at 80° C. | 1 month at 80° C. | 2 months at 80° C. | 3 months at 80° C. |
| --- | --- | --- | --- | --- | --- | --- |
| E0 | homogeneous | homogeneous | 20% phase separated | 30% phase separated | 50% phase separated | 70% phase separated |
| E1 | homogeneous | homogeneous | homogeneous | homogeneous | homogeneous | homogeneous |
| E2 | homogeneous | homogeneous | homogeneous | homogeneous | homogeneous | homogeneous |
| E3 | homogeneous | homogeneous | homogeneous | homogeneous | homogeneous | homogeneous |
| E4 | homogeneous | homogeneous | homogeneous | homogeneous | homogeneous | homogeneous |

Phase separation in E0 with no added Rhodibloc RS consists in appearance of a clear yellow gelled layer at the top of the sample. All samples containing Rhodibloc RS, even concentration as low as 0.038%, show significant improvement in storage stability with samples remaining completely homogeneous at least throughout the 3 months monitoring period.

Yield of Inversion

Viscosity measurements were used for evaluating the FR polymer inversion yield of the tested emulsions (since viscosity increase in dilute regime is directly proportional to the dissolved polymer concentration).

Viscosity measurements were performed with a DHR-2 (from TA Instruments) controlled stress rheometer equipped concentric cylinder measuring cell where rotor is helicoidal. Thanks to the helicoidal shape of the rotor, laminar mixing of the sample can be performed while measuring its viscosity. As such test protocol consists in applying constant shear rate of 400 s-1.40 mL of base fluid are initially placed in the cell and placed under shear. After 30+/−1 seconds, 0.4 mL of the considered inverse emulsion formulations were injected in the measurement cell. As a consequence active polymer concentration in solution is 0.3% if entirely released in solution. This is significantly higher concentration than typical concentration in use for friction reduction but allows better accuracy for the viscosity measurement. This test protocol allows formulation comparative evaluation on inversion speed e.g. how fast viscosity offsets and stabilize (endsets) at full hydration and final viscosity which gives some insight on the inversion yield.

Emulsions E0 to E4 hydration was evaluated in produced water representative of typical base fluids used for hydraulic fracturing in US shale plays. Water tested here are reconstitute using recipe reported in table here below:

EagleFord water composition (approx. 1000 ppm TDS)

|  | m in g for r 1L Dl water |
|---|---|
| NaCl | 0.282 |
| $Na_2CO_3$ | 0.424 |
| $NaHCO_3$ | 0.168 |
| $Na_2SO_4$ | 0.126 |
| $CaCl_2$ | 0.028 |

Diluted Ellenberger formation water to 50 000 ppm TDS:

|  | m in g for 1L Dl water |
|---|---|
| NaCl | 35.21 |
| $CaCl_2$ | 12.80 |
| $MgCl_2$ | 4.63 |

| Emulsion | Eagleford | | | Ellenberger 50K | | |
|---|---|---|---|---|---|---|
|  | t onset (s) | t endset (s) | final viscosity (mPa · s) | t onset (s) | t endset (s) | final viscosity (mPa · s) |
| E0 | 5 | 25 | 123 | 17 | 87 | 28 |
| E1 | 8 | 26 | 113 | 12 | 87 | 29 |
| E2 | 7 | 25 | 119 | 14 | 75 | 29 |
| E3 | 6 | 27 | 122 | 16 | 75 | 32 |
| E4 | 6 | 25 | 111 | 15 | 65 | 32 |

Inversion results show for EagleFord low salinity water limited to no impact of the Rhodibloc RS on inversion speed or yield. It is thus interesting to note that Rhodibloc RS even though a very powerful inverse emulsion stabilizer do not slow down or reduce FR polymer inversion yield. When FR emulsion is added to higher salinity Ellenberger 50K water, it is first to be noted that both inversion speed and yield are limited in presence of salt. Then Rhodibloc RS in the FR formulation would appear to even slightly improve inversion speed with decreased endset time. Here again no negative impact observed on inversion yield e.g. final viscosity constant.

The invention claimed is:

1. A friction reducer formulation comprising friction reducer polymers within the dispersed phase of an inverse emulsion, wherein said inverse emulsion contains a composition C comprising a mixture of:
    from 1% to 5% of at least an alkanolamide emulsifier selected from the group consisting of alkyl and alkenyl diethanolamides; and
    from 0.01 to 0.5% of a block copolymer, wherein the copolymer is a di-block copolymer comprising:
        a block A comprising repeating units derived from N-vinyl pyrrolidone; and
        a block B comprising repeating units derived from 2-ethyl-hexyl acrylate, and
    wherein % is in mass, based on a total mass of the inverse emulsion containing the composition C.

2. The friction reducer formulation of claim 1, wherein the ratio copolymer/alkanolamide corresponding to the quotient of the total mass of copolymer contained in composition C, to the total mass of the alkanolamide emulsifier contained in composition C is between 1 and 40%.

3. The friction reducer formulation of claim 2, wherein the ratio copolymer/alkanolamide corresponding to the quotient of the total mass of copolymer contained in composition C, to the total mass of the alkanolamide emulsifier contained in composition C is between 2 and 20%.

4. The friction reducer formulation of claim 1, wherein the friction reducer polymers are inverse polyacrylamide homo- or co-polymers.

5. The friction reducer formulation of claim 1, wherein the content of composition C is between 1.01% and 5%, in mass, based on the total mass of the emulsion containing the composition C.

6. The friction reducer formulation of claim 5, wherein the content of composition C is between 1.01% and 4% in mass, based on the total mass of the emulsion containing the composition C.

7. A fracturing fluid comprising a friction reducer formulation as defined in claim 1.

8. A method, comprising providing a friction reducer effect during a hydraulic fracturing operation using the inverse emulsion containing a composition C as defined in claim 1.

* * * * *